United States Patent
Kobres et al.

(10) Patent No.: US 10,154,008 B2
(45) Date of Patent: Dec. 11, 2018

(54) SCANNER ENABLED WITH A SECURE INPUT/OUTPUT (I/O) MODULE (SIOM)

(71) Applicants: Erick Kobres, Lawrenceville, GA (US); Stavros Antonakakis, Lake Mary, FL (US)

(72) Inventors: Erick Kobres, Lawrenceville, GA (US); Stavros Antonakakis, Lake Mary, FL (US)

(73) Assignee: NCR Corporation, Atlanta, GA (US)

( * ) Notice: Subject to any disclaimer, the term of this patent is extended or adjusted under 35 U.S.C. 154(b) by 148 days.

(21) Appl. No.: 14/573,043

(22) Filed: Dec. 17, 2014

(65) Prior Publication Data
US 2016/0182448 A1 Jun. 23, 2016

(51) Int. Cl.
H04L 29/06 (2006.01)

(52) U.S. Cl.
CPC ........ *H04L 63/0209* (2013.01); *H04L 63/164* (2013.01); *H04L 2463/102* (2013.01)

(58) Field of Classification Search
USPC .......... 726/14, 2, 21, 36; 713/150, 163, 181; 380/255, 264, 276
See application file for complete search history.

(56) References Cited

U.S. PATENT DOCUMENTS

| | | | | |
|---|---|---|---|---|
| 2002/0190128 A1* | 12/2002 | Levine | ............... | G06K 17/0022 235/462.13 |
| 2006/0028398 A1* | 2/2006 | Willmore | .................. | G06F 3/14 345/2.3 |
| 2008/0208758 A1* | 8/2008 | Spiker | ..................... | G06F 21/83 705/70 |
| 2008/0320587 A1* | 12/2008 | Vauclair | .................. | H04L 41/28 726/17 |
| 2009/0103726 A1* | 4/2009 | Ahmed | ................. | H04L 9/0668 380/46 |
| 2011/0112898 A1* | 5/2011 | White | .................. | G06Q 20/202 705/14.38 |
| 2013/0171939 A1* | 7/2013 | Tian | ........................ | H04B 7/24 455/41.2 |
| 2014/0068248 A1* | 3/2014 | Kobres | ................... | G06F 21/82 713/155 |
| 2015/0058970 A1* | 2/2015 | Raskin | ................ | H04L 63/0428 726/16 |
| 2015/0118958 A1* | 4/2015 | Jain | ...................... | G06Q 20/204 455/41.1 |
| 2015/0339662 A1* | 11/2015 | Huang | .................. | G06Q 20/34 705/67 |
| 2017/0032347 A1* | 2/2017 | Charpentier | ....... | G06K 9/00442 |

\* cited by examiner

*Primary Examiner* — Sharif E Ullah
(74) *Attorney, Agent, or Firm* — Schwegman, Lundberg & Woessner (57) ABSTRACT

A scanner is enabled for communication with a Secure Input/Output (I/O) Module (SIOM) using a secure communication protocol. The SIOM is provisioned with a manifest, and the manifest defines encryption for use over the secure communication protocol. Communication to and from the scanner occurs over secure communication sessions with the SIOM using the secure communication protocol.

18 Claims, 7 Drawing Sheets

SCANNER ENABLED WITH A SECURE INPUT/OUTPUT (I/O) MODULE (SIOM)

BACKGROUND

Online or electronic security is a major issue in the industry. It seems a month does not go by without news of some major business having a security breach. Such breaches include government agencies, retail outlets, social media companies, and even major banks.

Whenever an enterprise believes that a secure fix to remedy a breach has been deployed, hackers quickly figure out a new way to breach their systems. In some cases, the breaches are not even within the systems of the enterprise; rather, the breaches can occur over network transmission lines that enter or exit the enterprise systems; the hackers use sniffing techniques to acquire copies of data packets being transmitted over the network lines and find a way to break any encryption being used (assuming encryption was being used).

Advances are being made to combat security issues. For example, in the retail industry where a retailer has to ensure the integrity of financial transactions at Point-Of-Sale (POS) terminals, Secure Input/Output (I/O) Modules (SIOMs) have been deployed within POS terminals. These SIOMs are physical modules integrated into the POS terminals. The SIOM is a gatekeeper that establishes and manages encrypted communications between endpoint devices that support secure communications. The SIOM acts as a traffic cop, enforcing security policies and routing messages across device controllers.

However, many scanners associated with POS terminals lack access to a SIOM and may be network based. Scanners may sometimes be used to capture a variety of confidential information, such as credit card images, driver license images, check images, and the like. Moreover, even if scanners are not currently used to capture confidential information there is a desire for scanners to capture such information particularly to prove compliance with regulations (such as underage drinking by capturing the driver license) or to assist in processing checks for payment.

Therefore, there is a need for enabling scanners with SIOM capabilities.

SUMMARY

In various embodiments, techniques for enabling a scanner with a Secure Input/Output (I/O) Module (SIOM) are presented. According to an embodiment, a method for enabling a scanner with SIOM capabilities is presented.

Specifically, a pairing request is received from a Secure Input/Output Module (SIOM) and a scanner is configured to use a secure protocol for communicating with the SIOM in a secure session in response to the pairing request.

DETAILED DESCRIPTION

Figure 1A:
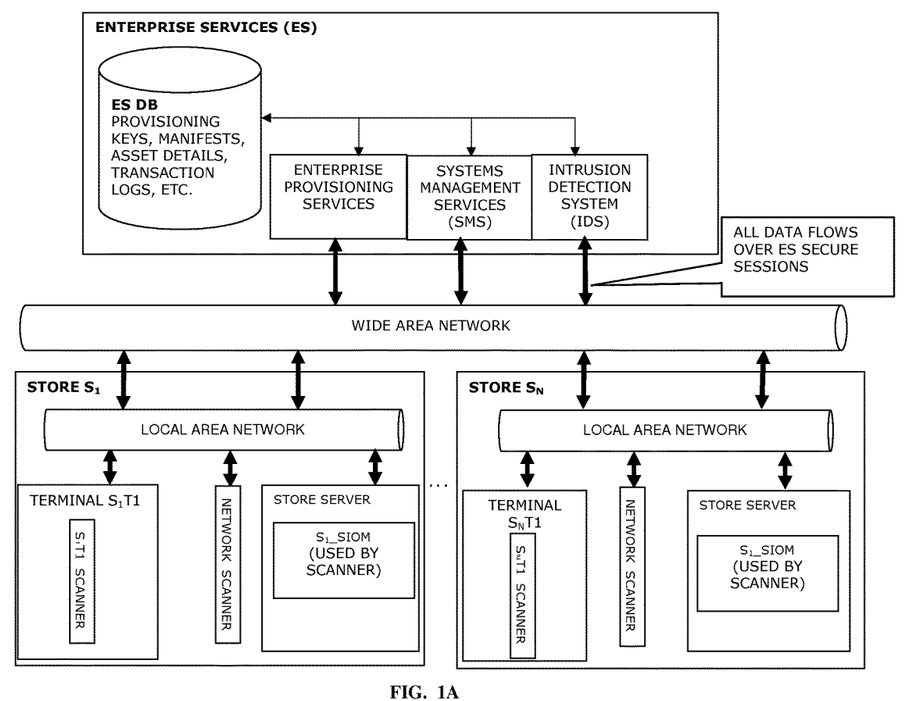
FIGS. 1A-1D are diagrams depicting various configurations of an enterprise system that provides Secure Input/Output (I/O) Module (SIOM) capabilities to scanners, according to an example embodiment.

FIG. 1A is a diagram of an enterprise system configuration that provides a Local-Area Network (LAN)-based Secure Input/Output (I/O) Module (SIOM) on a per store basis for scanners of a retailer enterprise, according to an example embodiment. The components of the enterprise system are shown in greatly simplified form with only those components shown necessary for the understanding of the various embodiments of the invention.

The enterprise system includes an enterprise service database, enterprise provisioning services, system management services, an Intrusion Detection System (IDS), a Wide-Area Network (WAN) and a plurality of retail stores. Each retail store includes a Local-Area Network (LAN), a LAN-accessible server, and a plurality of Point-Of-Sale (POS) terminals (may also be kiosks, Automated Teller Machines (ATMs), Self-Service Terminals (SSTs) or combinations thereof).

Each terminal includes a plurality of peripheral devices, such as but not limited to: scanners, pin pads, encrypted pin pads, Magnetic Strip/Card Readers (MSRs), printers, keyboards, displays, touch-screen displays, value-media dispensers, and the like. However, for purposes of discussion herein just the scanner peripheral devices are shown in the terminals and as network-based scanners connected to the LAN.

The LAN-accessible server includes a single SIOM for all store terminals and supports both the network scanner and terminal connected scanners. The scanners, which are integrated into the terminals, have communications serviced through their store server SIOMs. The network scanners, which are not tied to any specific terminal, also have communications serviced through their servers' SIOM.

All data that flows through the enterprise system occurs via secure sessions using a secure protocol. That is, a secure protocol defines custom encryption (encryption algorithms, encryption keys, and encryption key sizes) for each secure session (designated by a single bi-directional arrow in the FIG. 1A). Data flowing up or down through multiple secure sessions within the enterprise system can use different encryption profiles for each separate secure session, which is managed by the secure protocol.

Each SIOM (one per terminal (and/or store)) controls message passing to and from the scanners (whether integrated into a terminal or network based) within the store through a secure LAN session.

The enterprise database houses provisioning keys (for encryption, decryption, authentication, and the like), manifests (security rules, security policies, encryption algorithms/techniques, certificates, keys, security permissions, security roles, etc.), asset details (identifiers for devices, capabilities of devices, software resources, versioning information, etc.), transactions logs (for each retail store, for each terminal within a store, and for each peripheral device within each terminal), and other desired enterprise information desired to be collected and housed in the enterprise database.

The enterprise provisioning services are responsible for securely provisioning each SIOM of each store with a manifest from the enterprise database. This is achieved over the network using a secure encryption protocol over a secure session via the WAN connection. The manifest details how each per-store SIOM is to securely communicate with and monitor security for each of the terminals and associated scanners that the store's SIOMs services. For example, one encryption algorithm and set of keys for data payload passing to and from a particular scanner of a particular store may use a completely different encryption algorithm and set of keys for data payload passing to and from a network scanner within the same store or a complete different encryption for a different scanner associated with a different terminal within the same store.

The LAN-based SIOMs initiate a provisioning request for its manifests over secure sessions to the provisioning services. The provisioning services obtain the provisioning manifests from a hardware security module that is associated with the enterprise database and proceeds to provision the requesting LAN-based SIOMs. Once provisioned, the scanners re-establish their secure sessions with their requesting SIOMs.

Each scanner, via its Secure Device Controller (SDC), establishes a one-to-one pairing (independent secure session) over the LAN with the LAN-based SIOM when each scanner device is powered up. The request for pairing is securely transported over the LAN through a secure session to the store server where the LAN-based SIOM resides. Thus, a Man-In-The Middle (MITM) attack would be of no value to a hacker because the same level of security that is deployed with a per-terminal SIOM deployment is used with the LAN-based SIOM (utilizing the secure sessions managed by the secure protocol). This is so, even though scanner-to-SIOM communication is a LAN-based communication and not a direct device-to-device communication over a direct physical connection between a SIOM and a scanner. Again, it is noted that the scanner embedded in a terminal communicates with the store-based SIOM and the network-based scanner.

The LAN-based SIOM deployment depicted in the FIG. 1A may support a multi-tenant SIOM technique if the store SIOM is associated with multiple terminals within the store (only one terminal shown to illustrate the network scanner in each store. Each LAN-based SIOM is provisioned with several manifests; one manifest for each terminal including provisioning details for all the peripherals (including the scanner) within that terminal. So, multiple terminals within a single store may be supported by its single LAN-based SIOM (multi-tenant SIOM technique). The network scanner within each store may have its own store server SIOM (as depicted in the FIG. 1A) or may be included in the store based SIOM (not shown in the FIG. 1A).

Figure 1B:
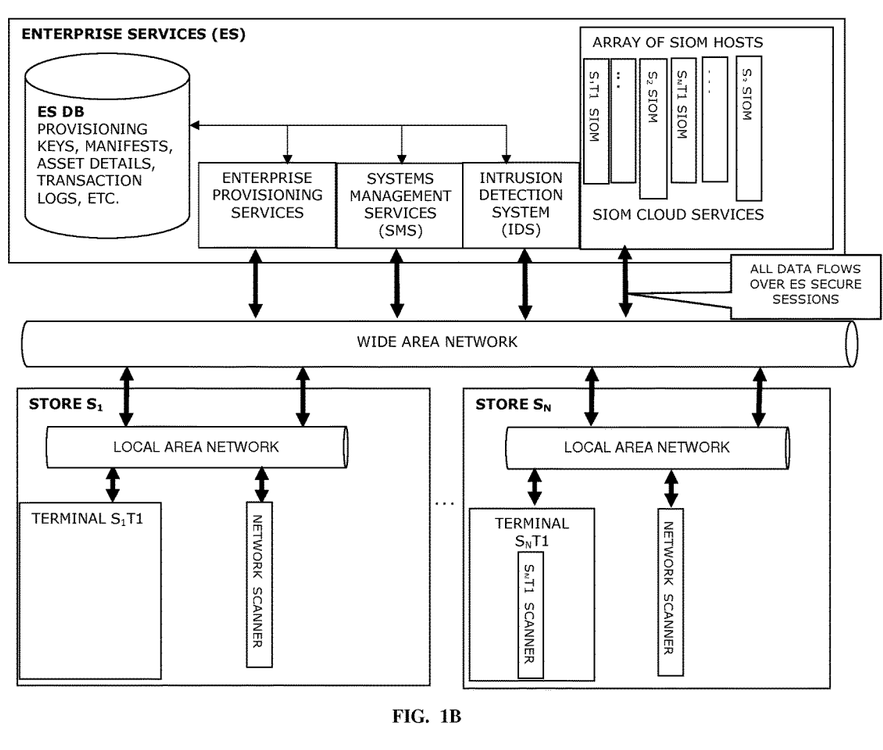

FIG. 1B is a diagram of an enterprise system configuration that provides single-tenant or multi-tenant access to SIOMs to terminals and peripherals within a store over a WAN for a retailer enterprise, according to an example embodiment. Access to the WAN-based SIOMs is available to both terminal based and network based scanners.

The LAN-based SIOMs of the FIG. 1A are moved to the WAN-accessible enterprise system components providing an end-to-end Security-as-a-Service option for customers. This configuration can include either a multi-tenant SIOM approach (as shown in the FIG. 1A) and/or a single-tenant SIOM approach (one SIOM per terminal or per scanner). In fact, a hybrid approach can be used where some stores use the configuration of the FIG. 1B for a multi-tenant approach and other stores use the same configuration of the FIG. 1B for a single-tenant approach.

The FIG. 1B provides the same level of security presented in the configurations of the FIG. 1A using the manifest provisioning and the secure sessions provided through the secure protocol.

The enterprise system provides a cloud-based SIOM configuration. The SDC for each scanner makes a one-to-one secure session pairing request with its SIOM over the LAN and through the WAN. All communication is secured and transported over both the LAN and the WAN.

Moreover, every scanner communicates through the enterprise SIOM for pairing, which is optimized for extreme responsiveness and low latency.

As noticed in the FIG. 1B (as compared to the FIG. 1A), individual stores on a store's server is not required. Thus, additional space and computing for hosting one or more SIOMs within a store's IT infrastructure is not required nor is IT personnel to manage the SIOM(s) within the store.

Figure 1C:
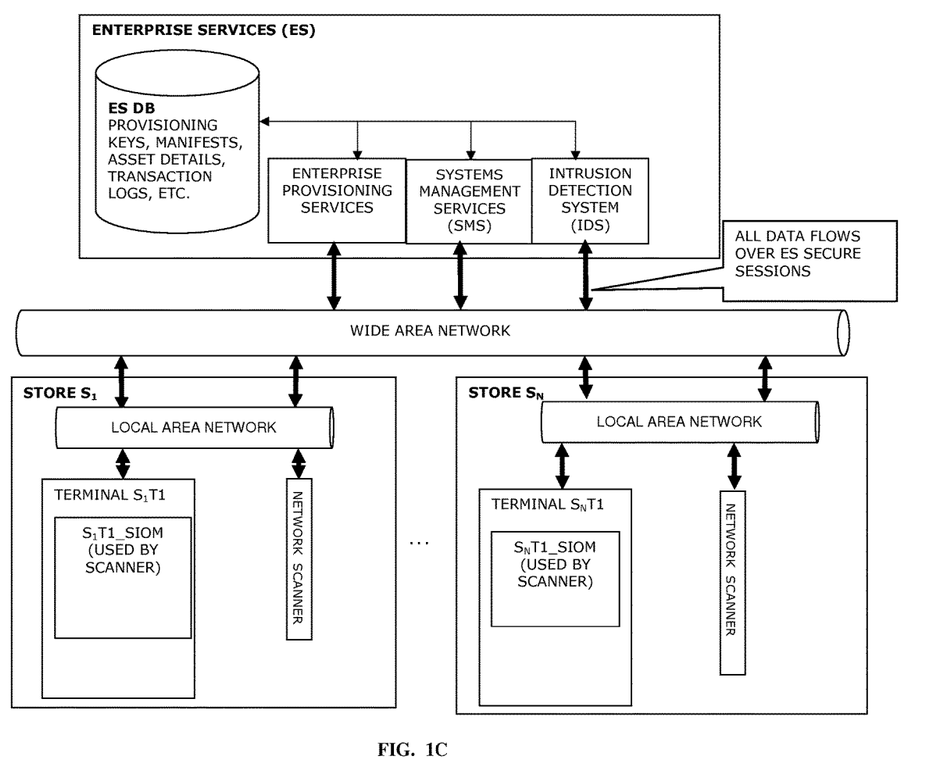

FIG. 1C is a diagram of an enterprise system configuration that provides a single SIOM integrated into a POS terminal. The configuration of the FIG. 1C supports a terminal within an integrated SIOM that services communications for a scanner integrated within the terminal and the FIG. 1C supports LAN-based SIOM support (provided by the terminal SIOM) for a network-based scanner.

Figure 1D:
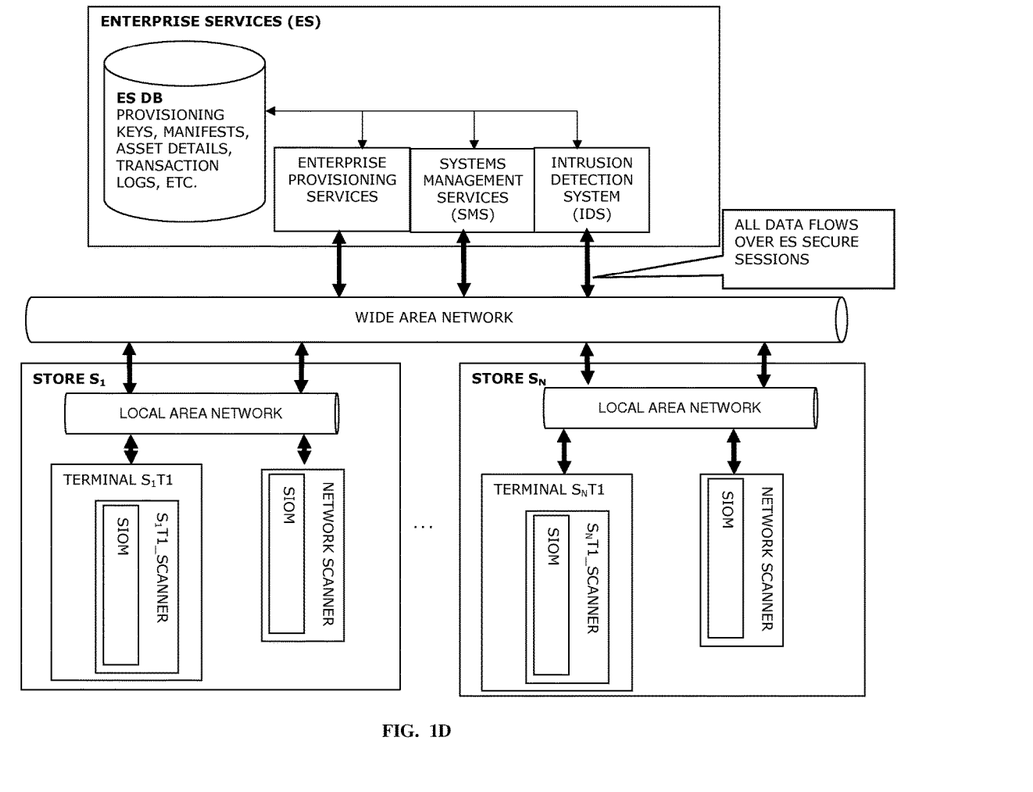

FIG. 1D is a diagram of an enterprise system configuration that provides a scanner with an integrated SIOM. The integrated SIOM can be for a scanner integrated within a POS terminal or can be for a network-based scanner.

Each scanner depicted in the FIGS. 1A-1D may include a tamper resistant secure module (TRSM) as a firmware execution and storage environment that is separate from a normal operating system and processing environment of each scanner. The TRSM permits secure storage and processing for: dynamic session keys, asymmetric key pairs (private and public), the secure session protocol for communication with a SIOM, a unique scanner device identifier, and other secure manifest details needed for establishing a secure session with a SIOM.

Each scanner also includes one or more wired or wireless communication ports.

The embedded SIOMs within the scanners of the FIG. 1D use its TRSM to host complete SIOM functionality as discussed above. This includes hosting the secure protocol, secure storage for the provisioning keys and provisioning manifests, functionality for provisioning services, and other SIOM mentioned features as discussed herein.

Moreover, the embedded SIOMs within the scanners of the FIG. 1D still pair with its embedded SIOM and all communications occur securely through the embedded SIOM using the secure protocol, as discussed above.

In some embodiments, an embedded SIOM within a particular scanner of the FIG. 1D (integrated within a terminal or network based) can support additional peripherals in a terminal that is not specific to the scanner. This configuration does require the scanner to be powered up and connected. The embedded SIOM adheres to the same provisioning policies as a standard locally hosted SIOM, store network SIOM, or even server of cloud-based SIOM. The embedded SIOM is a great option for a lightweight, low footprint deployment to drive secure scanner implementations.

The FIGS. 1A-1D demonstrate that, inter alia: i) a SIOM does not have to reside on the same physical host (terminal) as the scanners/peripherals that it supports, ii) a network-based SIOM can support multiple provisioning manifests (one for each terminal), iii) a network-based SIOM can simultaneously service multiple terminals and each terminals multiple peripherals/scanners, iv) security protocol communications remain consistent with the network-based SIOM approach except the data is transported over one or more networks (LAN and/or WAN) with a same level of inherent security maintained, v) a network-based SIOM permits SIOM-level security to be deployed to legacy or existing terminals that lack a physically built-in SIOM; vi) network based scanners that are independent of terminals can be serviced via a variety of SIOM configurations; and vi) a scanner can use its TRSM to implement and deploy a SIOM that services just that scanner or other peripherals that are independent of that scanner.

Existing scanners can be enhanced to enable the SIOM processing discussed herein for making scanner communications secure. Some existing types of scanners (or imagers) include: 1) 1D or 2D barcode scanners: flatbed scanners, presentation scanners, handheld scanners; 2) document scanners: flatbed, feeders, handheld, digitizers; and 3) hybrid bi-optic scanners that incorporate both barcode and image scanning.

These scanners are enhanced to support the secure session protocol, communicate unique device identifiers, provide secure storage for asymmetric key pairs and dynamically generated session keys. The scanners also include a wired or wireless port interface. In an embodiment, the secure storage and some or all processing associated with the enhancement resides in a TRSM (if the scanner is configured to have one and it would if the SIOM is embedded within the scanner as shown in the FIG. 1D).

The scanners enabled with SIOM capability provide a variety of novel benefits across a plethora of industries, such as but not limited to:

POS (Retail & Hospitality):

Securing scannable tenders such as store value chits, closed loop gift cards & reusable coupons.

Securing scannable employee IDs that can apply credit or discounts to a retail order.

Securing purchase order chits with barcodes that some merchants allow for tendering an order. For example, Target® issues temporary REDcard® chits to customers.

Securing scannable contractor cards that are tied to a contractor account and can be used to pay for orders while debiting the contractor's account.

Securing scannable ID cards such as a driver's license for age verification. Without revealing Date-Of-Birth (DOB), the SIOM can inform the POS application that the customer is "old enough" to purchase the age restricted item.

Securely capture image of a check for tendering. The scanner will capture the back and front of the check and then either encrypt and forward to the SIOM or perform secure Optical Character Recognition (OCR), extract check details (routing, check#, account, name, date, etc.), encrypt the data and send it to the SIOM where it can be routed appropriately for payment. Alternatives would be for the SIOM to perform the OCR and send the encrypted data, or send the entire raw encrypted images to a trusted service endpoint for extraction and Automated Clearing House (ACH) processing.

Secure manual card entry for unreadable mag stripes. While manual payment card entry will continue to decline (thanks in part to Europay MasterCard Visa (EMV) this remains a viable use case. If the magnetic strip is unreadable the attendant can capture a secure image of the front and back of the card. One of three alternative flows can then occur:

(a) Scanner OCRs the images and extracts the card data (Primary Account Number (PAN), expiry date, Card Verification Value (CVV)) encrypts and sends to SIOM, (b) Scanner encrypts the raw images and sends them to the SIOM. SIOM will OCR the images and extract the card data, encrypts and sends for card processing (c) Scanner encrypts the raw images and sends them to the SIOM; SIOM forwards the encrypted package to a secure service endpoint for card processing.

Secure ID scanning for store credit applications. When applying for a credit line/card at a retail store, a secure scan of a driver's license provides a substantial amount of consumer information reducing the time it takes to fill a form and making it less error prone. The consumer can visually confirm some of the card info extract, provide some additional personal information and the application can securely encrypted and sent for processing. The scanner or SIOM can optionally extract some of the non-sensitive data from the DL and display the customer for confirmation that this is indeed the customer's ID.

Securely scan Insurance Card and Personal ID for pharmacy prescription pick-up: at the pharmacy check-out counter the customer can be prompted to scan their insurance card followed by an ID card. This information is then securely compared (either in the scanner or in the SIOM) to verify a common identity as well as supply the necessary information for fulfilling the prescription order. The customer can then be prompted to sign the Banking Secure ID scanning & authentication: Either at the ATM or at the bank counter, a scanner can be used for capturing, encrypting & forwarding a personal ID for secure authentication. This authentication can serve variety of purposes and can be integrated into many business process flows such as: (a) identification prior to contract signing, (b) using an ID scan as confirmation, etc.

Remote check deposit: Similar to the process used in today's web based and smartphone apps for remote check deposit, this process can be secured further by using an SDC based scanner/imager either at home or inside a mobile device.

The above-discussed embodiments and other embodiments are now discussed with reference to the FIGS. 2-4.

Figure 2:
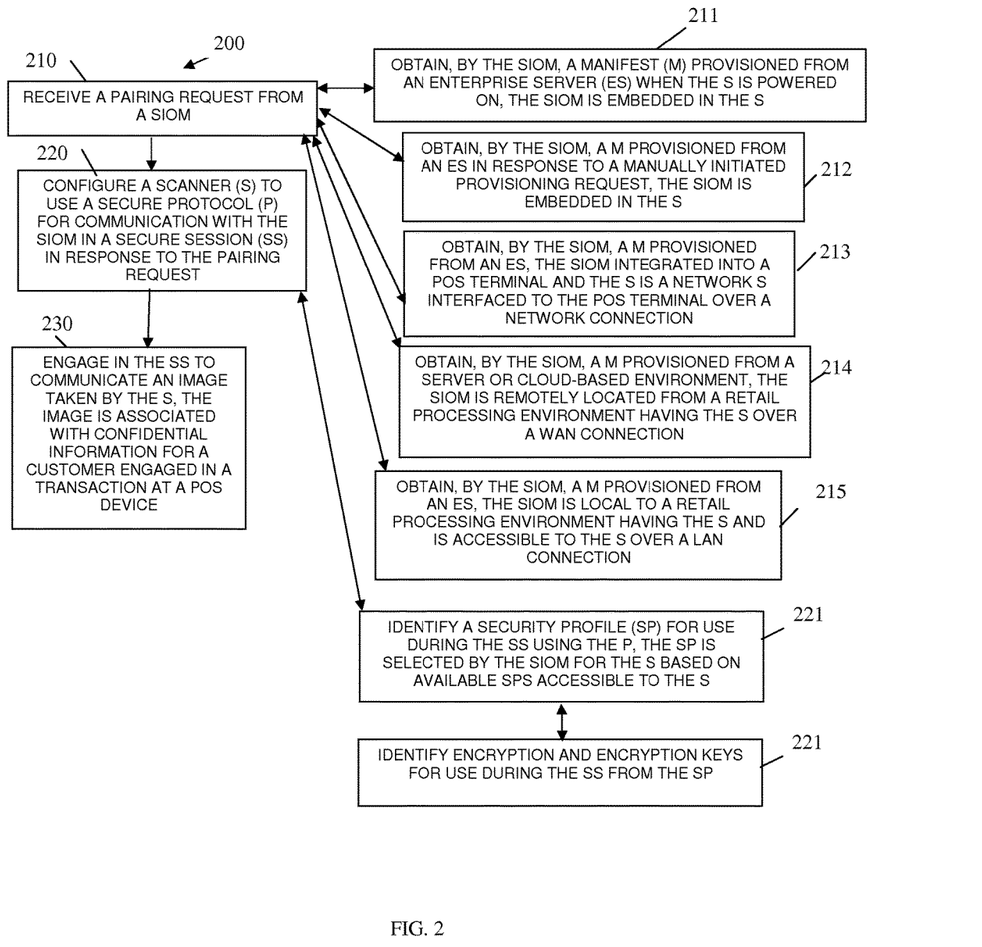
FIG. 2 is a diagram of a method for enabling a scanner with a SIOM, according to an example embodiment.

FIG. 2 is a diagram of a method for enabling a scanner with a SIOM, according to an example embodiment. The method 200 (hereinafter "scanner SIOM controller") is implemented as instructions programmed and residing in memory or on a non-transitory computer-readable (processor-readable) storage medium and executed by one or more processors of a scanner device. The processors are specifically configured and programmed to process the scanner SIOM controller. The scanner SIOM controller may or may not operate over a LAN and/or WAN.

In an embodiment, the scanner SIOM controller executes on any scanner depicted in the FIGS. 1A-1D.

At 210, the scanner SIOM controller receives a pairing request from a SIOM. It is noted that the scanner SIOM controller can also initiate a pairing request with the scanner SIOM controller.

According to an embodiment, at 211, the SIOM obtains a manifest provisioned from an enterprise server when the scanner is powered up. The manifest includes details for the SIOM to use the secure protocol to establish a secure session with the scanner. In this embodiment, the SIOM is embedded or integrated within the scanner itself. This scenario was shown in the FIG. 1D above.

In an embodiment, at 212, the SIOM obtains a manifest provisioned from an enterprise server in response to a manually initiated provisioning request. Again, the manifest includes details for the SIOM to use the secure protocol to establish a secure session with the scanner. In this embodiment, the SIOM is also embedded or integrated within the scanner itself. This scenario was shown in the FIG. 1D above.

According to an embodiment, at 213, the SIOM obtains a manifest provisioned from an enterprise server. The manifest includes details for the SIOM to use the secure protocol to establish the secure session with the scanner. Here, the SIOM is integrated into a POS terminal and the scanner is a network scanner interfaced to the POS terminal over a network connection. This scenario was discussed above with reference to the FIGS. 1A-1C.

In an embodiment, at 214, the SIOM obtains a manifest provisioned from a server or a cloud-based environment. The SIOM is remotely located from a retail processing environment having the scanner over a WAN connection. Again, the manifest includes details for the SIOM to use the secure protocol when establishing a secure session with the scanner. This scenario was discussed above with reference to the FIG. 1B.

In an embodiment, at 215, the SIOM obtains a manifest provisioned from an enterprise server. The SIOM is local to a retail processing environment having the scanner and is accessible to the scanner over a LAN connection. Again, manifest includes details for the SIOM to use the secure protocol when establishing a secure session with the scanner. This scenario was presented above with the FIG. 1B.

In an embodiment, at 216, the scanner SIOM service receives the manifest from the SIOM, which is integrated and embedded within the scanner. This scenario was presented above with the FIGS. 1A and 1C.

At 220, the scanner SIOM controller configures a scanner to use a secure protocol in a secure session in response to the pairing request.

In an embodiment, at 221, the scanner SIOM controller identifies a security profile for use during the secure session using the secure protocol. The security profile is selected by the SIOM for the scanner based on available security profiles accessible to the scanner.

In an embodiment of 221 and at 222, the scanner SIOM controller identifies encryption and encryption keys for use during the secure session from the security profile selected by the SIOM for the secure session.

According to an embodiment, at 230, the scanner SIOM controller engages in the secure communication session to communicate an image taken by the scanner. The image is associated with confidential information (such as a driver's license) for a customer engaged in a transaction at the POS device.

Figure 3:
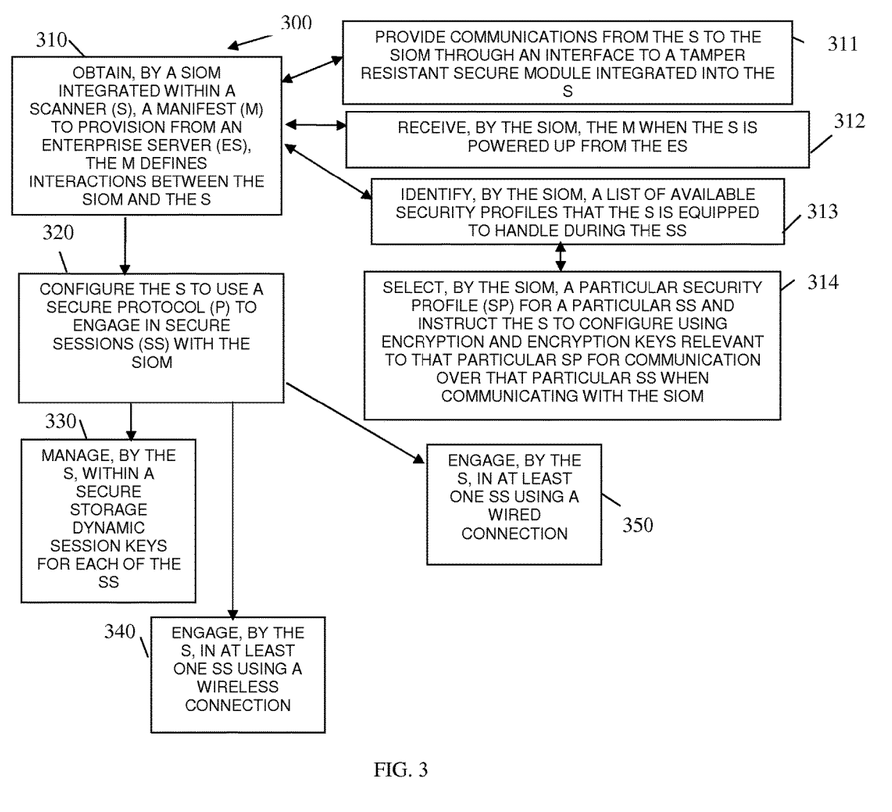
FIG. 3 is a diagram of another method for enabling a scanner with a SIOM, according to an example embodiment.

FIG. 3 is a diagram of another method for enabling a scanner with a SIOM, according to an example embodiment. The method 300 (hereinafter "SIOM embedded scanner controller") is implemented as instructions and programmed within memory or a non-transitory computer-readable (processor-readable) storage medium that executes on one or more processors of a scanner; the processors of the scanner are specifically configured to execute the SIOM embedded scanner controller. The SIOM embedded scanner controller may or may not be operational over LAN and/or WAN.

In an embodiment, SIOM embedded scanner controller is executed on any of the scanners depicted in the FIG. 1D.

At 310, a SIOM integrated within a scanner obtains a manifest provisioned from an enterprise server. The manifest defines interactions between the SIOM and the scanner.

According to an embodiment, at 311, the SIOM embedded scanner controller provides communications from the enterprise server to the SIOM through an interface to a tamper resistant secure module integrated into the scanner. This was discussed above with the FIGS. 1A-1D.

In an embodiment, at 312, the SIOM receives the manifest when the scanner is powered up. The manifest received from the enterprise server. In another case, the SIOM obtains the manifest in response to a manual provisioning request.

In an embodiment, at 313, the SIOM identifies a list of available security profiles that the scanner is equipped to handle during the secure sessions.

In an embodiment of 313 and at 314, the SIOM selects a particular security profile for a particular secure session and instructs the scanner, via the SIOM embedded scanner controller, to configure for using encryption and encryption keys relevant to that particular security profile for communication over that particular secure session when communicating with the SIOM.

At 320, the SIOM embedded scanner controller configures the scanner to use a secure protocol to engage in secure session with the SIOM.

According to an embodiment, at 330, the SIOM embedded scanner controller manages, within a secure storage, dynamic session keys for each of the secure sessions that the scanner is having with the SIOM or with other SIOMs (some of which may not be embedded within the scanner as is the SIOM discussed with the FIG. 3).

In an embodiment, at 340, the SIOM embedded scanner controller engages in at least one secure session using a wireless connection from the scanner (such as Bluetooth®, Low Energy Bluetooth® (LEB), Radio Frequency (RF), Infrared (IR), WiFi, Cellular, and the like).

In an embodiment, at 350, the SIOM embedded scanner controller engages in at least one secure session using a wired connection from the scanner (such as Ethernet, Universal Serial Bus, and the like).

Figure 4:
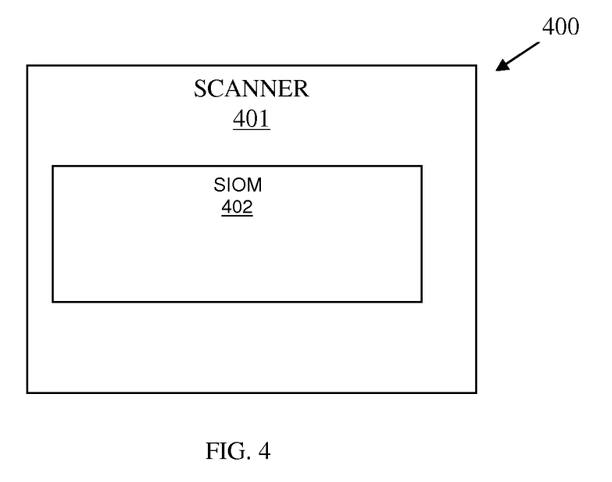
FIG. 4 is a diagram of a scanner with an embedded SIOM, according to an example embodiment.

FIG. 4 is a diagram of a scanner with an embedded SIOM 400, according to an example embodiment. Some components of the scanner with an embedded SIOM 400 are implemented as executable instructions and programmed within a non-transitory computer-readable (processor-readable) storage medium that execute on one or more processors of a scanner; the processors are specifically configured to execute the components of the scanner with an embedded SIOM 400. The network-based SIOM system 400 may or may not be operational over a LAN and/or WAN.

In an embodiment, the scanner with an embedded SIOM 400 implements, inter alia, the SIOMs embedded in the scanners presented in the FIG. 1D.

In an embodiment, the scanner with an embedded SIOM 400 implements some embodiments presented in the method 200 of the FIG. 2.

In an embodiment, the scanner with an embedded SIOM 400 implements, inter alia, the method 300 of the FIG. 3.

The scanner with an embedded SIOM 400 includes a scanner 401 and an embedded SIOM 402 integrated within the scanner 401.

In an embodiment, the scanner 401 is any scanner referenced above with the discussions of the FIG. 1D.

The embedded SIOM 402 is configured and adapted to: execute on the scanner 401, be provisioned with a manifest from an enterprise server, pair with the scanner 401 using at least a portion of the provisioned manifest, and establish a secure session for the scanner 401 to communicate with the SIOM 402 using a security profile defined by the portion of the manifest.

In an embodiment, the embedded SIOM 402 is further adapted and configured to: establish a different secure session with a peripheral that is external to the scanner 401 using a different portion of the provisioned manifest. So, the SIOM 402 is embedded or integrated within the scanner 401 but can service other secure sessions for other peripherals that are external to the scanner 401.

According to an embodiment, the scanner is one of: integrated into a POS terminal and operated as an independent network-based scanner independent of any particular terminal of a network.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
    receiving a pairing request from a Secure Input/Output Module (SIOM) executing on one or more hardware processors of a physical module of a device, wherein the device is a peripheral scanner that is integrated into a Point-Of-Sale (POS) terminal, and a POS terminal wherein the physical module is provided as a firmware execution and storage environment that is separate from a normal operating system and processing environment of the scanner;
    configuring a the scanner for processing a secure protocol for communicating with the SIOM in a secure session in response to the pairing request initiated from the SIOM, and controlling message passing between the scanner and the POS terminal through the secure session that passes through and is controlled by the SIOM, wherein configuring further includes identifying a security profile for use during the secure session using the secure protocol, wherein the security profile is selected by the SIOM for the scanner based on available security profiles accessible to the scanner; and
    engaging in the secure session to communicate an image taken by the scanner, wherein the image is associated with confidential information for a customer engaged in a transaction at the POS terminal.

2. The method of claim 1, wherein receiving further includes obtaining, by the SIOM, a manifest provisioned from an enterprise server when the scanner is powered up, wherein the manifest provides instructions for the SIOM for processing includes the secure protocol to establish the secure session with the scanner, and the SIOM is embedded as the physical module within the scanner that is the device.

3. The method of claim 1, wherein receiving further includes obtaining, by the SIOM, a manifest provisioned from an enterprise server in response to a manually initiated provisioning request, wherein the manifest provides instructions for the SIOM processing the secure protocol to establish the secure session with the POS terminal, and the SIOM is embedded as the physical module within the scanner that is the device.

4. The method of claim 1, wherein receiving further includes obtaining, by the SIOM, a manifest provisioned from an enterprise server, wherein the manifest provides instructions for the SIOM processing the secure protocol to establish the secure session with the scanner.

5. The method of claim 1, wherein receiving further includes obtaining, by the SIOM, a manifest provisioned from a server or cloud-based environment, wherein the manifest includes provides instructions for the SIOM processing the secure protocol to establish the secure session with the scanner.

6. The method of claim 1, wherein receiving further includes obtaining, by the SIOM, a manifest provisioned from an enterprise server, the SIOM is local to a retail processing environment within the scanner and is accessible to the other scanners over a LAN connection, and wherein the manifest includes provides instructions for the SIOM processing the secure protocol to establish the secure session with the other scanners.

7. The method of claim 1, wherein identifying further includes identifying encryption and encryption keys for use during the secure session from the security profile.

8. A method, comprising:
    obtaining, by a Secure Input/Output Module (SIOM) integrated within a scanner and executing on one or more processors of a physical module of the scanner, a manifest provisioned from an enterprise server, the manifest defining instructions for processing by the SIOM for interacting with the scanner, wherein the scanner is a peripheral device, and wherein the physical module is provided as a firmware execution and storage environment that is separate from a normal operating system and processing environment of the scanner; and
    configuring the scanner to use a secure protocol to engage in secure sessions with the SIOM, wherein configuring further includes controlling Point-Of-Sale (POS) terminal message passing between: 1) one or more of: a POS terminal and other POS terminals and 2) the scanner through the SIOM during the secure sessions; wherein configuring further includes identifying a security profile for use during the secure sessions using the secure protocol, wherein the security profile is selected by the SIOM for the scanner based on available security profiles accessible to the scanner;
    engaging in at least one of the secure sessions to communicate an image taken by the scanner, wherein the image is associated with confidential information for a customer engaged in a transaction at the POS terminal.

9. The method of claim 8, wherein obtaining further includes providing communications from the enterprise server to the SIOM through an interface to a tamper resistant secure module integrated into the scanner, wherein the physical module is the tamper resistant secure module.

10. The method of claim 8, wherein obtaining further includes receiving, by the SIOM, the manifest when the scanner is powered up from the enterprise server.

11. The method of claim 8, wherein obtaining further includes identifying, by the SIOM, a list of the available security profiles that the scanner is equipped to handle during the secure sessions.

12. The method of claim 11, wherein identifying further includes selecting, by the SIOM, a particular security profile for a particular secure session and instructing the scanner to configure for using encryption and encryption keys relevant to that particular security profile for communication over that particular secure session when communicating with the SIOM.

13. The method of claim 8 further comprising, managing, by the scanner, within a secure storage dynamic session keys for each of the secure sessions.

14. The method of claim 8 further comprising, engaging, by the scanner, in at least one secure session using a wireless connection.

15. The method of claim 8 further comprising, engaging, by the scanner, in at least one secure session using a wired connection.

16. A system comprising:
   a scanner that is a peripheral device;
   a secure input/output module (SIOM) integrated as a physical module within the scanner, the SIOM configured to:
   i) execute on one or more hardware processors of the physical module and identify a security profile for use during the secure session using the secure protocol, wherein the security profile is selected by the SIOM for the scanner based on available security profiles accessible to the scanner,
   ii) Be provisioned with a manifest from an enterprise server,
   iii) Pair to the scanner using at least a portion of the provisioned manifest, and
   iv) establish a secure session for the scanner to communicate with the SIOM using the security profile defined by the portion of the manifest and control message passing during the secure session and other message passing for other secure sessions occurring between the scanner and a plurality of Point-Of-Sale (POS) terminals and communicate an image taken by the scanner,
   wherein the image is associated with confidential information for a customer engaged in a transaction at the POS terminal,
   wherein the manifest includes instructions processed by the SIOM for pairing with the scanner and for establishing the secure session and the other sessions;
   wherein the physical module is a firmware execution and storage environment that is separate from a normal operating system and processing environment of the scanner.

17. The system of claim 16, wherein the SIOM is further configured and adapted to: v) establish a different secure session with a peripheral that is external to the scanner using a different portion of the provisioned manifest.

18. The system of claim 16, wherein the scanner is one of: integrated into one of the POS terminals and operated as an independent network-based scanner independent of any particular terminal of a network.

* * * * *